United States Patent [19]

Lacher

[11] Patent Number: 4,503,472
[45] Date of Patent: Mar. 5, 1985

[54] BIPOLAR TIME MODULATED ENCODER/DECODER SYSTEM

[75] Inventor: William A. Lacher, Lansdale, Pa.

[73] Assignee: Burroughs Corp., Detroit, Mich.

[21] Appl. No.: 528,581

[22] Filed: Sep. 1, 1983

[51] Int. Cl.³ .......................... G11B 5/09; H04L 27/10
[52] U.S. Cl. ........................................ 360/43; 375/55; 360/40
[58] Field of Search ....................... 360/43, 40; 375/55

[56] References Cited
U.S. PATENT DOCUMENTS 4,287,596 9/1981 Chari ...................................... 360/43
4,441,193 4/1984 Bell ........................................ 360/43

Primary Examiner—Vincent P. Canney
Attorney, Agent, or Firm—F. A. Varallo; E. M. Chung; K. R. Peterson

[57] ABSTRACT

An encoder/decoder is described which allows data transmission on an A.C. coupled transmission system. The encoder converts a serial data stream comprised of combinations of logical "1"'s and "0"'s in an NRZ format to an output pulse train. The latter is characterized not only by phase reversal for each bit of data, as required for A.C. coupled systems, but by bit durations which are dissimilar for a logic "1" and "0". The encoded data is transmitted and subsequently applied to the decoder which restores the data to an NRZ format, and provides a corresponding series of clock pulses for interpreting the data. The encoder/decoder may be implemented in a simple logic configuration.

10 Claims, 17 Drawing Figures

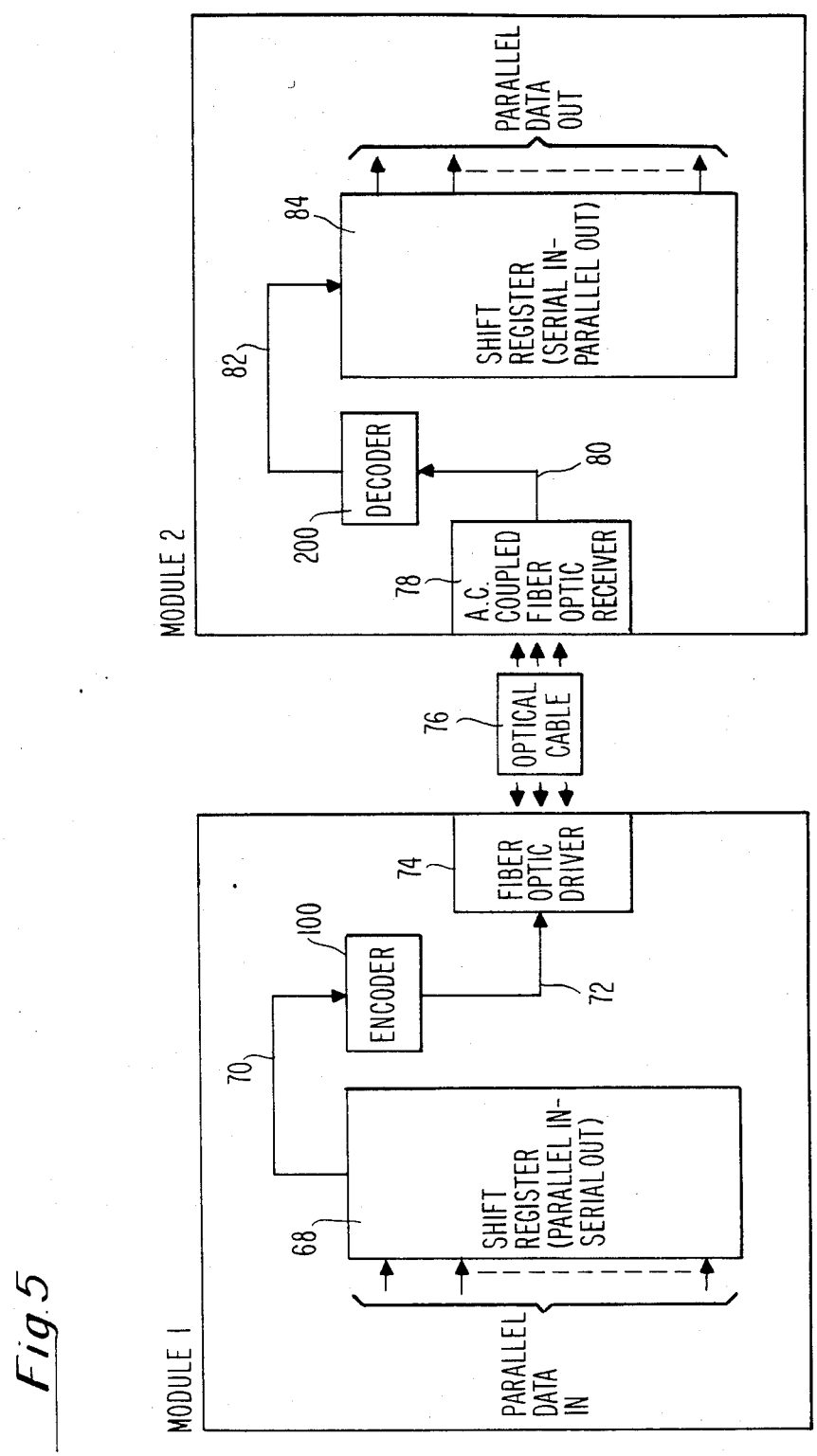

BIPOLAR TIME MODULATED ENCODER/DECODER SYSTEM

BACKGROUND OF THE INVENTION

In the field of digital communications, data in binary form, that is, logical "1"'s and "0"'s, are represented by two voltage levels, unipolar in nature. The latter signals are commonly referred to as being in an NRZ (non return to zero) format. When these voltage levels are used in confined areas and are not too widely dispersed, transmission of the levels may be accomplished by direct, that is, D.C., coupling. However, the current trend to convert parallel information to serial data streams and to send such information long distances has created the need for amplification of the signals to insure the integrity of the data received.

Signal amplification using D.C. coupling amplifiers is possible, but drift in such amplifiers makes them undesirable. On the other hand, A.C. coupled amplifiers are easier to design and control, but by their very nature, require signals that alternately exhibit phase reversals, that is, have positive-going excursions followed by negative-going ones. Additionally, these alternating patterns must be substantially continuous and free of interruption for any appreciable length of time. Several schemes have been devised for coding the NRZ data to make it compatible with A.C. coupling. These include Manchester coding, frequency shift coding, phase-shift keying, phase-delay keying and various modifications thereof.

The present invention provides a different and unique encoder/decoder for use with A.C. coupled receivers. The design which is implemented with simple logic configurations has the added advantage of allowing a lower bit frequency on a per bit basis or requiring less time to send a corresponding stream of data when compared with the aforementioned encoding/decoding schemes.

SUMMARY OF THE INVENTION

In accordance with the invention, there is provided an encoder/decoder for use in serial transmission systems having A.C. coupled receivers. A phase reversal is required for each logical bit of data in the train. While there are presently various methods of achieving the latter, all such methods involve careful control and uniformity of the bit durations in time. In contrast, the encoder portion of the present invention deliberately changes the duration of a logical "1", compared to a logical "0".

In an actual operative embodiment, the present encoder includes a programmable counter for encoding the serial NRZ data stream. The counter receives the data and clock pulses (T) from a source thereof. If the data is "high", corresponding to a logical "1", the counter is conditioned to generate a pulse every three clock times, 3T; if the data is low, a pulse will be generated every 2T times. The pulse output of the counter is applied to the complement terminal of a flip-flop. The output of the latter represents encoded data suitable for A.C. coupled transmission.

Thus, for consecutive "1"'s in the NRZ data stream, the flip-flop output will be succession of pulses of 3T time duration, alternately reversing in polarity. Similarly, for "0"'s, the flip-flop output will be a series of 2T pulses, alternating in polarity. Combinations of "1"'s and "0"'s in the input data stream result in corresponding 3T and 2T duration pulses respectively from the flip-flop.

To decode the transmitted data, the present decoder includes a pair of exclusive NOR input stages, each having two input terminals. The coded data is applied in common to one terminal of both input stages, and the same data delayed 2T times and 3T times is applied respectively to the other input terminals of the stages. An output flip-flop having "set" and "reset" terminals is coupled to the input stages.

An input stage receiving a 3T data pulse (logical "1") and the same pulse delayed 2T, generates a "set" pulse. Similarly, the other input stage generates a "reset" pulse for a 2T data input (logical "0") and the same pulse delayed 3T times applied concurrently to its respective input terminals.

Additional gating and delay means couple the "set" and "reset" pulse outputs of the input stages to the corresponding terminals of a flip-flop. The aforementioned additional means serve as digital filters which prevent small width deviations in the pulses from causing the spurious setting or resetting of the last mentioned flip-flop. The output of the latter represents NRZ data—the clock pulses associated therewith being generated concurrently by the decoder.

It is thus apparent from the foregoing description that with the selection of different durations for a coded logical "1" and "0", the present system provides a means of time compression during data transmissions. If, for example, the transmission of many more "0"'s is expected compared to "1"'s, the speed of transmission will be greatly increased over systems in which the coding provides for equal duration "1"'s and "0"'s.

It should be noted that the invention is not limited to the particular choice of coded pulse durations. For example, a logical "1" may be made 2T; a logical "0", 3T, if the application shows this to be advantageous. Similarly, other pulse duration ratios for the logic states might be utilized.

Other features and advantages of the present invention will become apparent in the detailed description thereof which follows.

BRIEF DESCRIPTION OF THE DRAWINGS

FIG. 5 illustrates a typical transmission system utilizing the encoder/decoder of FIGS. 1 and 3.

DESCRIPTION OF THE PREFERRED EMBODIMENT

Figure 1:
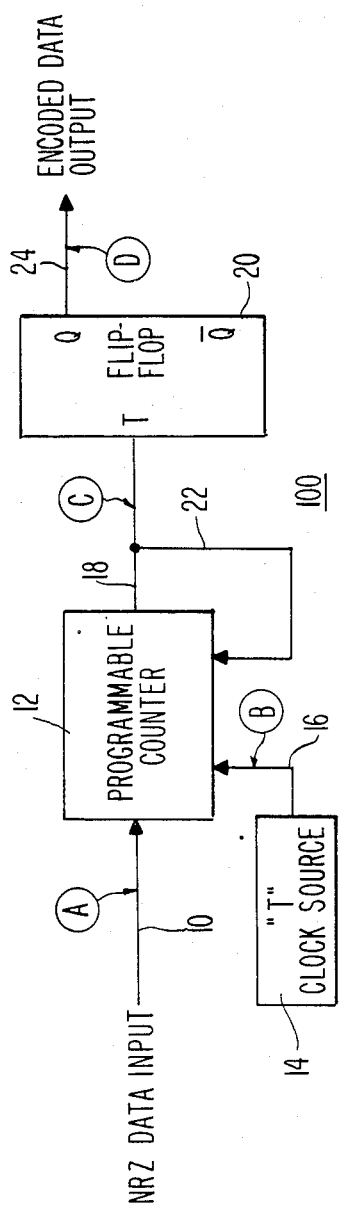
FIG. 1 is a diagram of the encoder portion of the present invention.
Figures 2A, 2B, 2C:
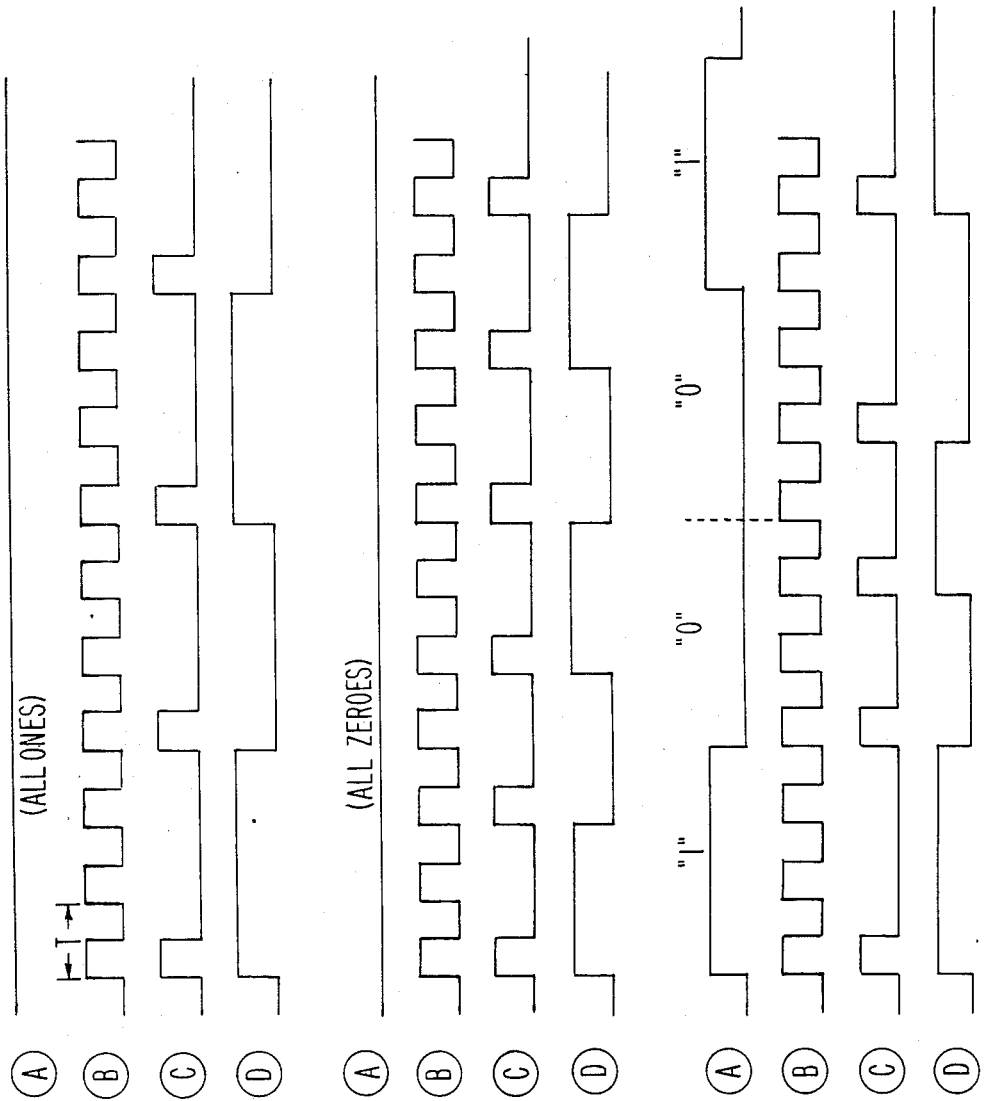
FIGS. 2A, 2B and 2C are waveform diagrams applicable to the encoder of FIG. 1.

Reference is made to FIG. 1 which is a block diagram of the encoder portion 100 of the present invention and to the accompanying waveform diagrams of FIGS. 2A, 2B and 2C. The waveforms labeled "A" through "D" inclusive in the latter figures are those appearing at the like-lettered points in FIG. 1. Serial data appearing on line 10 enters an input terminal of a programmable counter 12. In addition to the data, a controlled fixed frequency clock source 14 supplies clock pulses of "T" duration to counter 12 via line 16. The clock source 14 is preferably a crystal oscillator for accuracy and stability and the period "T" is chosen to suit the particular application. The programmable counter 12 is designed so that a logical high, that is, a "1" on line 10 causes it to count 3T periods before producing an output pulse on line 18. Similarly, a low level or logical "0" on line 10 conditions the counter to produce an output pulse after 2T periods. A toggle or complementary flip-flop 20 is provided. The complement terminal, T, of the latter is coupled to line 18. A pulse produced by counter 12 appearing on line 18 performs two functions. It resets the counter via line 22 and complements the flip-flop. The encoded data appears on line 24 coupled to the Q terminal of flip-flop 20.

With continued general reference to FIG. 1, and specific reference to FIG. 2A, it is assumed that the input NRZ data at point "A" is maintained "high", representing a succession of logical "1"'s. This high level is applied to the input terminal of counter 12. The clock pulses of predetermined period "T" appear at point "B". After each 3T count, a pulse is provided at point "C", the leading edge of which complements flip-flop 20. The encoded data appears at point "D". With reference to the latter in FIG. 2A, it should be observed that the output square wave pulses reverse in polarity every 3T time periods, and the pulse width is always 3 times T, for a logical "1" NRZ data input.

In FIG. 2B, it is assumed as seen in "A", that the input NRZ data is a succession of logical "0"'s. The "low" level input applied to the counter 12 causes the latter to count 2T periods before outputting and resetting. Again, the clock pulses having a period "T" are shown at "B", the complement pulses at "C" and the encoded data at "D". The latter illustrates successive polarity reversals of the 2T square wave pulses.

FIG. 2C illustrates an NRZ data stream at point "A", which is a combination of logical "1"'s and "0"'s, The pattern appearing at "A" is "1,0,0,1". The encoded pattern at "D" is generated in the same manner as that previously described. Thus, at "D", the coded data for "1,0,0,1" is represented by a positive-going 3T pulse, followed by two respective negative and positive-going 2T pulses, and finally, a negative 3T pulse.

The decoder portion 200 of the present invention will next be described with reference to the circuit diagram of FIG. 3 and the accompanying waveform diagram of FIG. 4. The waveforms in the lettered rows of the latter figure are those appearing at the like-lettered points in the former.

Figure 3:
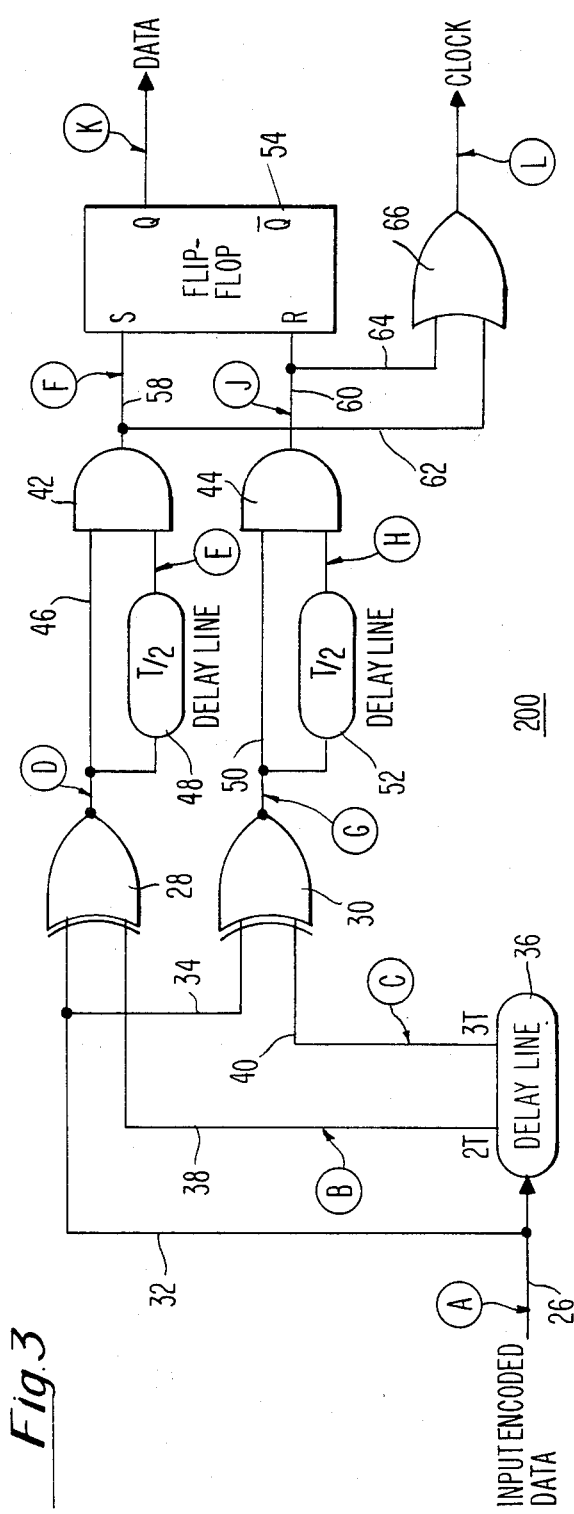
FIG. 3 is a diagram of the decoder portion of the present invention.

It is assumed that the encoded information appearing at "D" in FIG. 2C has been transmitted, amplified if necessary in an A.C. coupled receiver, and is present at point "A" on line 26 of FIG. 3 as the input to the decoder. With reference to FIG. 3 and the accompanying waveforms of FIG. 4, the decoder includes a pair of input stages comprised of exclusive-NOR gates 28 and 30, each having a pair of input terminals and an output terminal. The encoded data at "A" is applied via lines 32 and 34 to one input terminal in each of the gates 28 and 30. The data at "A" also enters a delay line 36 which is tapped at 2T and 3T delay periods. The data at "A" delayed 2T in delay line 36 appears on line 38 at "B" and is applied to the other input terminal of exclusive-NOR gate 28. Similarly, the data appearing at "C" has been delayed by 3T and is applied via line 40 to the other input terminal of exclusive-NOR gate 30.

A pair of AND gates 42 and 44, each having a pair of input terminals and an output terminal are provided. A pulse on the output terminal of the exclusive-NOR gate 28, at point "D" is coupled via line 46 directly to one input of AND gate 42, and after delay by a T/2 period in delay line 48 as seen at "E", to the other input terminal of the latter. Similarly, an output at point "G" of exclusive-NOR gate 30 is applied directly to an input terminal of AND gate 44 via line 50, and delayed by T/2 in delay line 52 as seen at "H" to the other input terminal of AND gate 44.

A set/reset flip-flop 54 is provided having "S" and "R" terminals coupled via lines 58 and 60 respectively to the output terminals of AND gates 42 and 44. Thus, an output from AND gate 42 appearing at "F" puts flip-flop 54 into the set state; while, an output from AND gate 44, at "J", drives it to the reset state. The decoded DATA appears at "K" on the Q output terminal of flip-flop 54.

The outputs "F" and "J" of AND gates 42 and 44 are applied via lines 62 and 64 to a pair of input terminals of OR gate 66, which is chosen to have a predetermined delay from its input terminal to its output terminal. The pulses appearing on its output terminal at "L" are the CLOCK pulses accompanying the DATA at "K".

Figure 4:
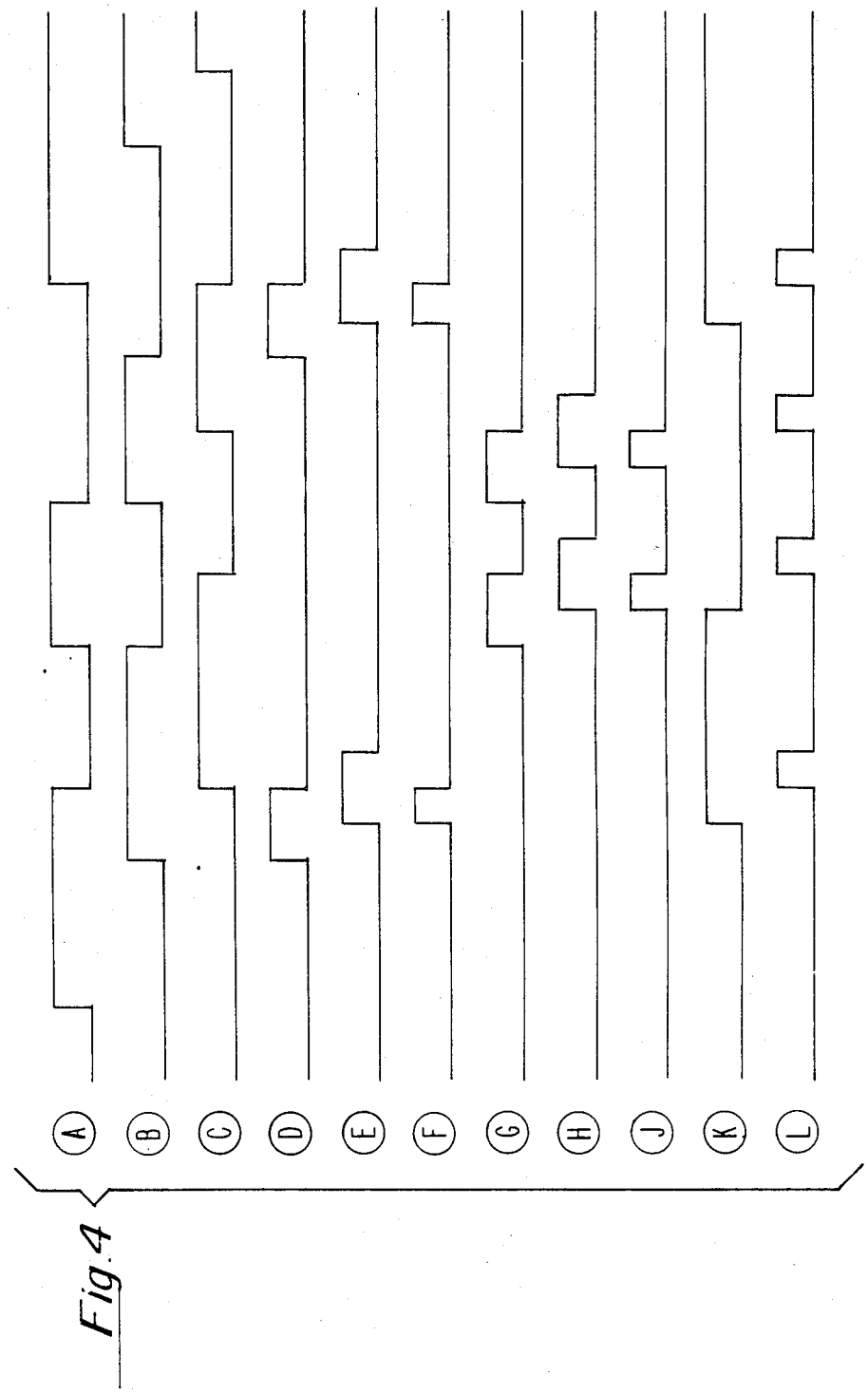
FIG. 4, including A-L, is a waveform diagram applicable to the decoder of FIG. 3.

With specific reference to FIG. 4, the first 3T duration positive-going pulse (a logical "1") at "A", and the same pulse delayed 2T at "B" are compared in exclusive-NOR gate 28. The result is a positive pulse at "D", which along with its T/2 delayed counterpart at "E" are applied to AND gate 42, yielding a signal at "F", which sets flip-flop 54. The output positive-going DATA pulse of the latter is seen at "K", which represents an NRZ format. Concurrently, the signal at "F" passes through OR gate 66, is delayed therethrough, and emerges as a clock pulse at "L". Since the DATA is examined at the clock times, the appearance of the first "L" pulse occurring when the DATA is "high" characterizes it as a logical "1", as previously defined herein. It is apparent that if the initial square pulse at "A" had been either positive or negative with a 2T duration (a logical "0"), no output would have resulted at "D".

Considering the first negative-going pulse at "A", a logical "0", exclusive-NOR 30 which accepts a fixed 3T delayed pulse on one of its input terminals, generates the first pulse at "G" (FIG. 4). The latter pulse and its delayed form at "H", result in a pulse at "J" which is applied to the "R" terminal of flip-flop 54, and resets the latter on its leading edge. This is seen at "K", where the DATA line goes negative. The reset pulse at "J", also passes through OR gate 66, and after a predetermined delay, emerges as the second clock pulse "L". Note that at this clock time, the DATA line at "K" is low, signifying a logical "0".

The next positive-going 2T pulse (logic "0") at "K", when compared in gate 30 to the same pulse delayed 3T time, produces a positive output pulse at "G" and ultimately a reset pulse at "J". Since flip-flop 54 is already in the reset state, the DATA output at "K" remains low. The third clock pulse at "L" occurs while "K" is low, signifying the presence of a logical "0".

Finally, the next 3T encoded data pulse and its 2T delayed counterpart, applied to gate 28, provides an output at "D", which causes a set pulse at F, and the flip-flop 54 is driven to the set state. The output at "K" goes positive and the clock pulse at "L", thereafter, signifies the presence of a logical "1". Thus, the stream of encoded data at "A", namely, "1,0,0,1" has been decoded to restore its original NRZ equivalent at "K".

FIG. 5 illustrates in simplified fashion, a transmission system utilizing the present invention as described hereinbefore. The organization of FIG. 5 has been chosen solely for purposes of example, and is not to be considered limitative of the invention. It should be noted that the data duration is not a fixed number but since the system described is asynchronous, proper timing relationships must be accounted for both at the sending and receiving ends of the networks. The following represents a typical method of implementing the system timing.

Two cabinets or modules, 1 and 2 are depicted. Module 1, the sending unit, includes a shift register 68 for receiving input data in parallel and for outputting a serial stream. The data may be placed into shift register 68 at any rate so long as the total time is not faster than the serial data rate multiplied by the number of bits. The bit time for this calculation is either the duration of a logical "1", or a logical "0", whichever has been predetermined to be greater. The encoder 100, which is that depicted in FIG. 1, operating at a faster rate than the data input rate, takes the data out of the shift register 68 via line 70 at a rate which is non linear. That is, the encoder data rate is dependent upon the logical contents, ("1"'s and "0"'s), of the serial stream.

The encoded data on line 72 controls a fiber optic driver 74 which drives an L.E.D. or laser diode whose "ON" time is determined by the data itself. This train of light pulses is transmitted over a fiber optic cable 76 to a receiving cabinet or module 2.

More specifically, the time modulated light pulses are received within module 2 by a photodiode or phototransistor and amplified by an A.C. coupled receiver 78. The output of the receiver is applied by way of line 80 to decoder 200, as seen in FIG. 3, which provides the DATA and CLOCK to serially insert the data via line 82 into shift register 84. Data may be taken out of register 84 at any rate, after a predetermined number of incoming clock times or by other detecting means at the discretion of the system designer. If desired, equal duration NRZ "1"s and "0"s may be reestablished at this time.

In conclusion, there has been described a unique encoder/decoder system for use with A.C. coupled receivers. In an actual operative embodiment of the invention, ECL type logic was employed. It should be understood that changes and modifications of the circuit organization presented herein may be needed to suit particular requirements. Such changes and modications are well within the skill of the electronics circuit designer, and insofar as they are not departures from the true scope and spirit of the invention, are intended to be covered by the following claims.

What is claimed is:

1. An encoder/decoder system for encoding an NRZ data stream of two unipolar voltage levels to bipolar time-modulated data pulses and for decoding the latter comprising:

an encoder portion of said encoder/decoder system, said encoder portion including programmable counter means having a plurality of input terminals and an output terminal, a source of clock pulses, means for applying said NRZ data and said clock pulses respectively to a first and a second of said plurality of input terminals, said voltage levels of said NRZ data conditioning said counter means to count a respective pair of different predetermined numbers of clock pulses before generating signal pulses on said output terminal thereof, a first bistable means coupled to said output terminal of said counter means and being switched alternately between opposite stable states in response to the occurrence of said signal pulses, said first bistable means having an output terminal, said bipolar time-modulated data pulses appearing on the latter terminal, a decoder portion of said encoder/decoder system, said decoder portion including a pair of comparator means each having a pair of input terminals and an output terminal, delay means having an input terminal and a pair of output terminals, means coupling the output terminal of said first bistable means in common to an input terminal of each of said pair of comparator means and to said input terminal of said delay means, the pair of output terminals of said delay means being coupled respectively to the other input terminals of each of said comparator means, the delay in said data pulses provided by said delay means between said input terminal and said pair of output terminals thereof corresponding respectively to the time intervals for counting said pair of different predetermined numbers of clock pulses, each of sad comparator means generating a pulse on said output terminal thereof in response to the concurrence of data signals on its respective input terminals, a second bistable means having set and reset terminals and an output terminal, means coupling the respective output terminals of said comparator means to said set and reset terminals, the signals appearing on the output terminal of said second bistable means in response to the setting and resetting thereof representing decoded data, and logic means coupled to said set and reset terminals for generating clock-type pulses in concurrence with said decoded data.

2. An encoder/decoder system as defined in claim 1 further characterized in that said output terminal of said counter means is coupled to a third of said plurality of input terminals thereof, each of said signal pulses appearing on said last mentioned output terminal effecting the resetting of said counter means.

3. An encoder/decoder system as defined in claim 2 wherein said first bistable means is a toggle-type flip-flop.

4. An encoder/decoder system as defined in claim 3 wherein each of said pair of comparator means is an exclusive-NOR logic gate.

5. An encoder/decoder system as defined in claim 4 further characterized in that said means couplng the respective output terminals of said comparator means to said set and reset terminals of said second bistable means comprises a pair of AND gates each having a pair of input terminals and an output terminal, said output terminal of each of said comparator means being connected to an input terminal of one of said AND gates, a pair of delay lines, each of said delay lines being interposed between said output terminal of a comparator means and the other input terminal of one of said AND gates, the output terminals of said AND gates being connected respectively to said set and reset terminals of said second bistable means.

6. An encoder/decoder system as defined in claim 5 wherein said second bistable means is a set/reset-type flip-flop.

7. An encoder/decoder system as defined in claim 4 wherein said logic means for providing means clock-type pulses in said decoder portion is an OR gate, said OR gate having a predetermined delay from each of said input terminals to said output terminal thereof.

8. An encoder/decoder system as defined in claim 7 wherein the delays in said data pulses provided by said delay means are respectively time intervals corresponding to two and three times the period of said clock pulses.

9. An encoder/decoder system as defined in claim 8 wherein the delay in each of the delay lines interposed between one of said comparator means and one of said AND gates is equal to one half the period of said clock pulses.

10. An encoder/decoder system as defined in claim 9 characterized in that said means coupling the output terminal of said first bistable means in common to an input terminal of each of said pair of comparator means and to said input terminal of said delay means includes fiber optic transmission line means.

* * * * *

UNITED STATES PATENT AND TRADEMARK OFFICE
CERTIFICATE OF CORRECTION

PATENT NO. : 4,503,472
DATED : March 5, 1985
INVENTOR(S) : William A. Lacher

It is certified that error appears in the above-identified patent and that said Letters Patent are hereby corrected as shown below:

Cover page, change "17 Drawing Figures" to --7 Drawing Figures--.

Col. 7, Claim 7, line 6, after "providing" delete "means" and insert --said--.

Signed and Sealed this

Twenty-fourth Day of September 1985

[SEAL]

Attest:

Attesting Officer

DONALD J. QUIGG

Commissioner of Patents and Trademarks—Designate